(12) United States Patent
Shih et al.

(10) Patent No.: US 12,393,304 B1
(45) Date of Patent: Aug. 19, 2025

(54) TOUCH CIRCUIT

(71) Applicant: Novatek Microelectronics Corp., Hsinchu (TW)

(72) Inventors: Chia-Chien Shih, Hsinchu County (TW); Yu-Huang Chen, Tainan (TW); I-Te Liu, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/582,655

(22) Filed: Feb. 21, 2024

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ................................ G06F 3/0418; G06F 3/044
See application file for complete search history.

(56) References Cited

U.S. PATENT DOCUMENTS

| | | | |
|---|---|---|---|
| 10,082,922 B2 | 9/2018 | Hanssen et al. | |
| 10,572,058 B2* | 2/2020 | Kim | H03K 21/08 |
| 10,684,726 B2* | 6/2020 | Chen | H03K 17/962 |
| 10,976,796 B2* | 4/2021 | Anantharaman | G06F 3/0418 |
| 11,093,090 B2 | 8/2021 | Larsson et al. | |
| 11,853,514 B2 | 12/2023 | Kim et al. | |
| 11,861,111 B2* | 1/2024 | Kim | G06F 3/04166 |
| 2010/0097345 A1* | 4/2010 | Jang | G06F 3/041661 345/174 |
| 2010/0110040 A1* | 5/2010 | Kim | G06F 1/3237 345/174 |
| 2010/0328252 A1* | 12/2010 | Chang | G06F 3/044 345/174 |
| 2012/0218020 A1* | 8/2012 | Erdogan | G06F 3/04166 327/337 |
| 2012/0287077 A1* | 11/2012 | Pant | G06F 3/0418 345/174 |
| 2014/0021966 A1* | 1/2014 | Shahrokhi | G01R 27/2605 324/679 |
| 2021/0173501 A1 | 6/2021 | Larsson et al. | |
| 2022/0360275 A1 | 11/2022 | Maharyta et al. | |
| 2023/0108545 A1 | 4/2023 | Kim et al. | |

FOREIGN PATENT DOCUMENTS

| | | |
|---|---|---|
| CN | 115395959 | 11/2022 |
| TW | 202123457 | 6/2021 |
| TW | 202314583 | 4/2023 |

OTHER PUBLICATIONS

"Notice of allowance of Taiwan Counterpart Application", issued on Sep. 27, 2024, p. 1-p. 3.

* cited by examiner

*Primary Examiner* — Doon Y Chow
(74) *Attorney, Agent, or Firm* — JCIPRNET

(57) ABSTRACT

A touch circuit including an integrator circuit and a compensation circuit is provided. The integrator circuit includes a first terminal, a second terminal and an output terminal. The first terminal of the integrator circuit is coupled to a touch sensor, and the second terminal of the integrator circuit is coupled to a first voltage. The compensation circuit includes a first terminal and a second terminal. The first terminal of the compensation circuit is coupled to the first terminal of the integrator circuit, and the second terminal of the compensation circuit is coupled to a second voltage. When the touch circuit senses a sensing current from the touch sensor, the first voltage is increased and the second voltage is decreased.

15 Claims, 9 Drawing Sheets

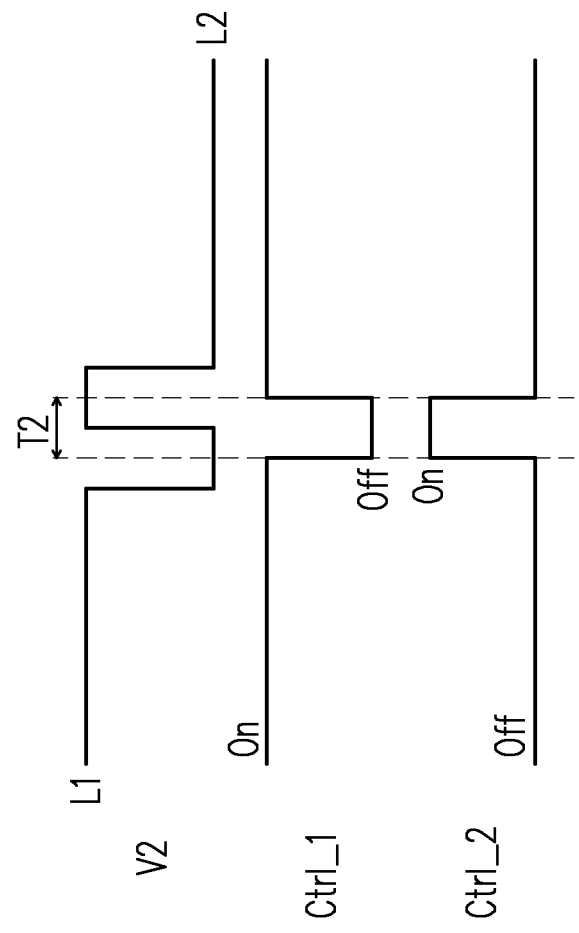
FIG. 6B
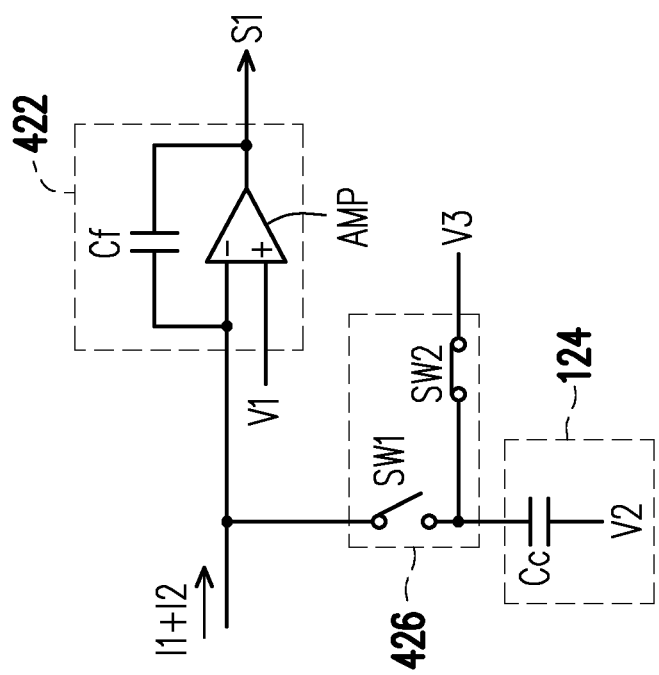

TOUCH CIRCUIT

BACKGROUND

Technical Field

The invention relates to an electronic circuit, more specifically, to a touch circuit.

Description of Related Art

The touch circuit receives both the reference current and the sensing current generated by the touch sensor. The touch circuit then divides the current and sends it to the current integrator for processing. The touch circuit is to detect the sensing current. However, it is important to note that the reference current is significantly larger than the sensing current. An excessively large reference current can easily cause the current integrator to saturate, rendering the touch circuit unable to detect the sensing current. To address this issue, a capacitive compensation circuit is utilized to generate a compensation current that can reduces the reference current.

Traditionally, the compensation current is generated by a compensation voltage coupled to the compensation capacitor. However, when the voltage amplitude is limited, a large compensation capacitance is often necessary to reduce the reference current.

SUMMARY

The invention is directed to a touch circuit, that can increase the compensation current of the compensation capacitor, thereby reducing the required capacitance value for the compensation circuit.

An embodiment of the invention provides a touch circuit including an integrator circuit and a compensation circuit. The integrator circuit includes a first terminal, a second terminal and an output terminal. The first terminal of the integrator circuit is coupled to a touch sensor, and the second terminal of the integrator circuit is coupled to a first voltage. The compensation circuit includes a first terminal and a second terminal. The first terminal of the compensation circuit is coupled to the first terminal of the integrator circuit, and the second terminal of the compensation circuit is coupled to a second voltage. When the touch circuit senses a sensing current from the touch sensor, the first voltage is increased and the second voltage is decreased.

An embodiment of the invention provides a touch circuit including an integrator circuit and a compensation circuit. The integrator circuit includes a first terminal, a second terminal and an output terminal. The first terminal of the integrator circuit is coupled to a touch sensor, and the second terminal of the integrator circuit is coupled to a first voltage. The switch circuit includes a first terminal, a second terminal and a third terminal. The first terminal of the switch circuit is coupled to the first terminal of the integrator circuit. The compensation circuit includes a first terminal and a second terminal. The first terminal of the compensation circuit is coupled to the second terminal of the switch circuit, and the second terminal of the compensation circuit is coupled to a second voltage. The third terminal of the switch circuit is coupled to a third voltage. The switch circuit is configured to switch many times to make the second voltage switch between a first level and a second level. The first level is larger than the second level.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 6A, FIG. 6B, FIG. 6C and FIG. 6D respectively show the different stages of operation of the touch circuit of FIG. 4 and its signal waveforms according to different embodiments of the invention.

DESCRIPTION OF THE EMBODIMENTS

Embodiments are provided below to describe the disclosure in detail, though the disclosure is not limited to the provided embodiments, and the provided embodiments could be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" could refer to a current, a voltage, a charge, a temperature, data, electromagnetic wave or any one or multiple signals.

Figure 1:
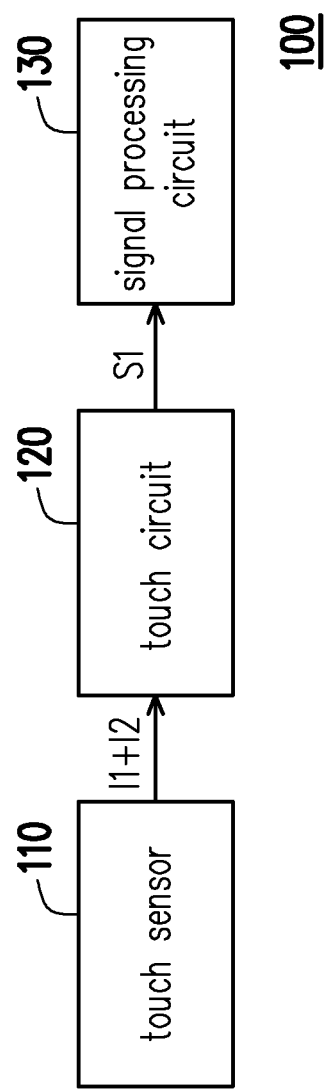
FIG. 1 is a block diagram illustrating a touch device according to an embodiment of the invention.
Figure 2:
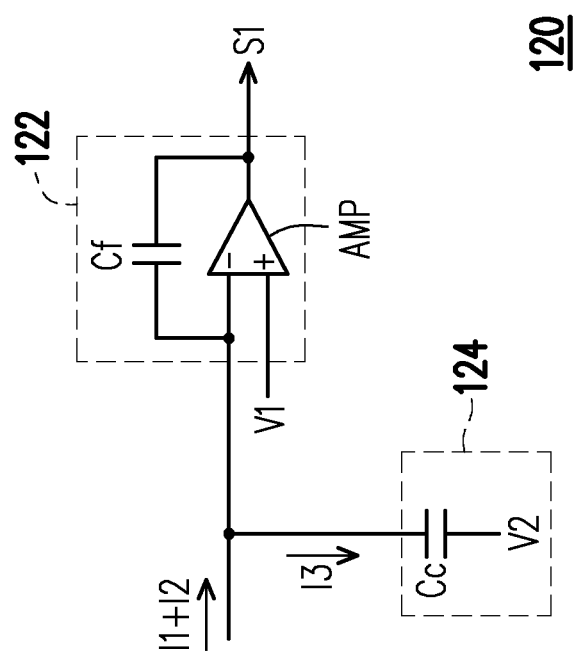
FIG. 2 is a schematic diagram illustrating a touch circuit of FIG. 1 according to an embodiment of the invention.

FIG. 1 is a block diagram illustrating a touch device according to an embodiment of the invention. FIG. 2 is a schematic diagram illustrating a touch circuit of FIG. 1 according to an embodiment of the invention. Referring to FIG. 1 and FIG. 2, the touch device 100 includes a touch sensor 110, a touch circuit 120 and a signal processing circuit 130. The touch sensor 110 is configured to sense a touch event and output a reference current I1 and a sensing current I2 to the touch circuit 120, wherein the sensing current I2 may be generated due to a user that touches the touch sensor 110. The touch circuit 120 is configured to receive the reference current I1 and the sensing current I2 and output a sensing signal S1 to the signal processing circuit 130, and then the sensing signal S1 is processed by the signal processing circuit 130.

Implementation for the structures of the touch sensor 110 and the signal processing circuit 130 could be obtained, taught and suggested with reference to common knowledge in the related art.

The touch circuit 120 includes an integrator circuit 122 and a compensation circuit 124. The integrator circuit 122 is configured to generate the sensing signal S1 according to the reference current I1 and the sensing current I2 and output the sensing signal S1 to the signal processing circuit 130.

To be specific, the integrator circuit 122 includes an operational amplifier AMP and a first capacitor Cf. The operational amplifier AMP includes an inverting terminal, a non-inverting terminal and an output terminal. The inverting terminal of the operational amplifier AMP serves as the first terminal of the integrator circuit 122 and is coupled to the touch sensor 110. The non-inverting terminal of the operational amplifier AMP serves as the second terminal of the integrator circuit 122 and is coupled to a first voltage V1. The output terminal of the operational amplifier AMP serves as the output terminal of the integrator circuit 122 and is coupled to the signal processing circuit 130. The touch sensing signal S1 is outputted from the output terminal of the operational amplifier AMP to the signal processing circuit 130.

The first capacitor Cf includes a first terminal and a second terminal. The first terminal of the first capacitor Cf is coupled to the inverting terminal of the operational amplifier AMP. The second terminal of the first capacitor Cf is coupled to the output terminal of the operational amplifier AMP.

On the other hand, the compensation circuit 124 includes a second capacitor Cc (a compensation capacitor). The second capacitor Cc includes a first terminal and a second terminal. The first terminal of the second capacitor Cc serves as the first terminal of the compensation circuit 124 and is coupled to the inverting terminal of the operational amplifier AMP. The second terminal of the second capacitor Cc serves as the second terminal of the compensation circuit 124 and is coupled to the second voltage V2.

The main purpose of the touch circuit 120 is to detect the sensing current I2. However, the reference current I1 is very large compared to the sensing current I2, and the excessively large reference current I1 will easily cause the integrator circuit 122 to saturate, making the touch circuit 120 unable to detect the sensing current I2.

In the present embodiment, the compensation circuit 124 generates a compensation current I3 by switching the first voltage V1 and the second voltage V2 to reduce the reference current I1. For example, when the touch circuit 120 senses the sensing current I2 from the touch sensor 110, the first voltage V1 is increased and the second voltage V2 is decreased, so as to increase the equivalent cross voltage change of the second capacitor Cc.

Figure 3:
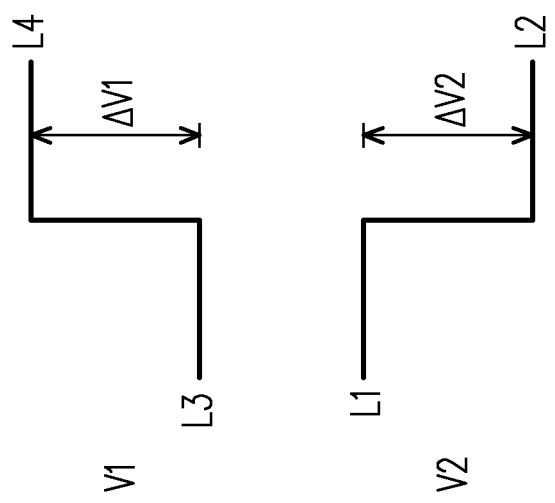
FIG. 3 is a waveform diagram illustrating voltage levels of the first voltage and the second voltage according to an embodiment of the invention.

FIG. 3 is a waveform diagram illustrating voltage levels of the first voltage and the second voltage according to an embodiment of the invention. The voltage levels of the first voltage V1 and the second voltage V2 may changed as illustrated in FIG. 3. When the touch circuit 120 senses the sensing current I2 from the touch sensor 110, the second voltage V2 is decreased and the voltage level of the second voltage V2 is changed from a first level L1 to a second level L2, wherein the first level L1 is larger than the second level L2. The decrement is the difference ΔV2.

In the meanwhile, when the touch circuit 120 senses the sensing current I2 from the touch sensor 110, the first voltage V1 is increased and the voltage level of the first voltage V1 is changed from a third level L3 to a fourth level LA, wherein the fourth level LA is larger than the third level L3. The increment is the difference ΔV1.

Therefore, the compensation charge stored in the second capacitor Cc is increased due to the equivalent cross voltage change of ΔV1+ΔV2. This increase in compensation charge results in an increase in the compensation capacity, such as the compensation current I3, of the compensation circuit 124. As a result, the required capacitance value of the second capacitor Cc for the compensation circuit 124 is reduced.

Figure 4:
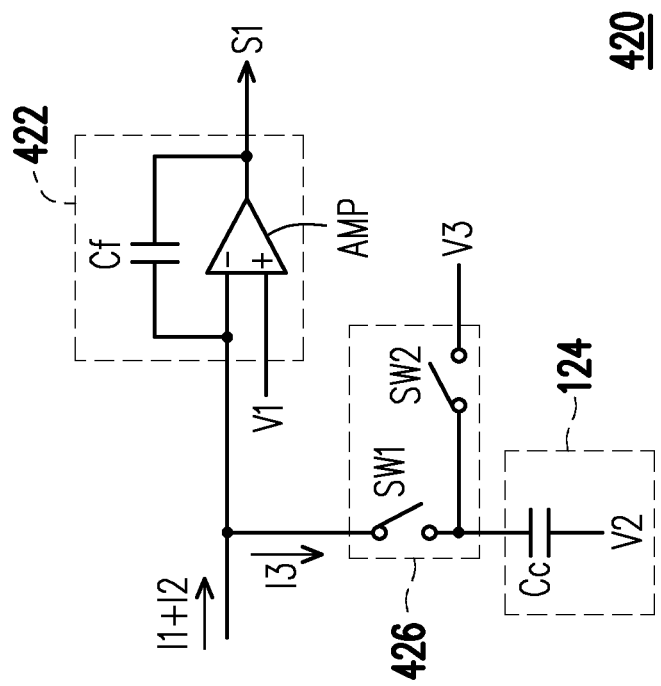
FIG. 4 is a schematic diagram illustrating a touch circuit according to another embodiment of the invention.
Figure 5:
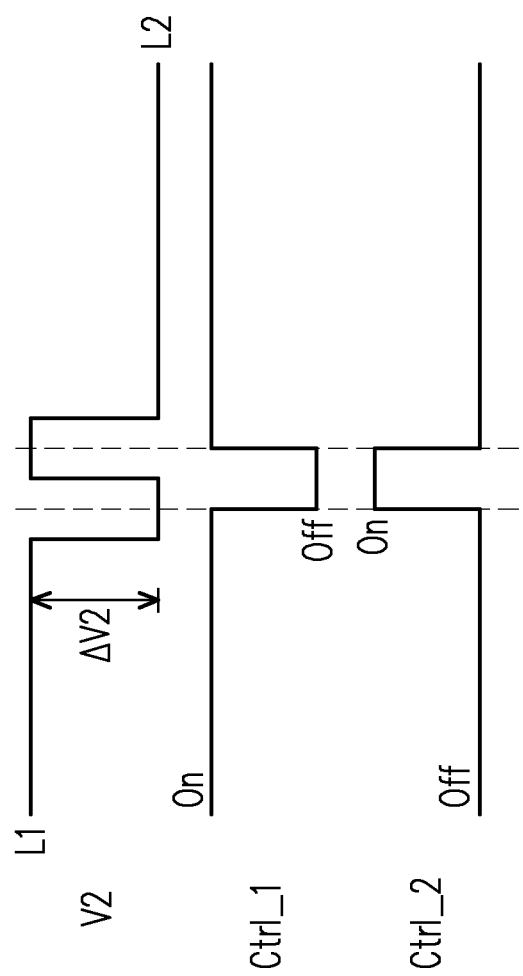
FIG. 5 is a waveform diagram illustrating voltage levels of the second voltage and control signals of FIG. 4 according to an embodiment of the invention.

FIG. 4 is a schematic diagram illustrating a touch circuit according to another embodiment of the invention. FIG. 5 is a waveform diagram illustrating voltage levels of the second voltage and control signals of FIG. 4 according to an embodiment of the invention. Referring to FIG. 4 and FIG. 5, the touch circuit 420 further includes a switch circuit 426. The switch circuit 426 is configured to switch many times to make the second voltage V2 switch between a first level L1 and a second level L2, wherein the first level L1 is larger than the second level L2.

The switch circuit 426 includes a first terminal, a second terminal and a third terminal. The first terminal of the switch circuit 426 is coupled to the inverting terminal of the operational amplifier AMP. The second terminal of the switch circuit 426 is coupled to the first terminal of the second capacitor Cc. The third terminal of the switch circuit 426 is coupled to a third voltage V3, wherein the first voltage V1 is larger than or equal to the third voltage V3, and the first voltage V1 and the third voltage V3 are constant voltages.

To be specific, the switch circuit 426 includes a first switch SW1 and a second switch SW2. The first switch SW1 includes a first terminal, a second terminal and a control terminal. The first terminal of the first switch SW1 serves as the first terminal of the switch circuit 426 and is coupled to the inverting terminal of the operational amplifier AMP. The second terminal of the first switch SW1 serves as the second terminal of the switch circuit 426 and is coupled to the first terminal of the first terminal of the second capacitor Cc. The control terminal of the first switch SW1 is controlled by a first control signal Ctrl_1.

The second switch SW2 includes a first terminal, a second terminal and a control terminal. The first terminal of the second switch SW2 is coupled to the second terminal of the first switch. The second terminal of the second switch SW2 serves as the third terminal of the switch circuit 426 and is coupled to the third voltage V3. The control terminal of the second switch SW2 is controlled by a second control signal Ctrl_2.

The following section describes the different stages of operation of the touch circuit 420 and its signal waveforms.

FIG. 6A, FIG. 6B, FIG. 6C and FIG. 6D respectively show the different stages of operation of the touch circuit of FIG. 4 and its signal waveforms according to different embodiments of the invention. Referring to FIG. 6A to FIG. 6D, in FIG. 6A, the touch circuit 420 operates in a first stage T1. When the touch circuit 420 operates in the first stage T1, the second voltage V2 is changed from the first level L1 to the second level L2. The first switch SW1 is conducted, and the second switch SW2 is not conducted, so that the first terminal of the second capacitor Cc is connected to the first voltage V1, and the compensation current I3_1 is generated to reduce the reference current I1.

In FIG. 6B, the touch circuit 420 operates in a second stage T2. When the touch circuit 420 operates in the second stage T2 after the first stage T1, the second voltage V2 is changed from the second level L2 to the first level L1. The first switch SW1 is not conducted, and the second switch SW2 is conducted, so that the first terminal of the second capacitor Cc is connected to the third voltage V3. The purpose of this stage is to disconnect the compensation circuit 424 from the integrator circuit 422 when the second voltage V2 is back to the first level L1 to avoid current backflow to the integrator circuit 422.

Figure 6A:
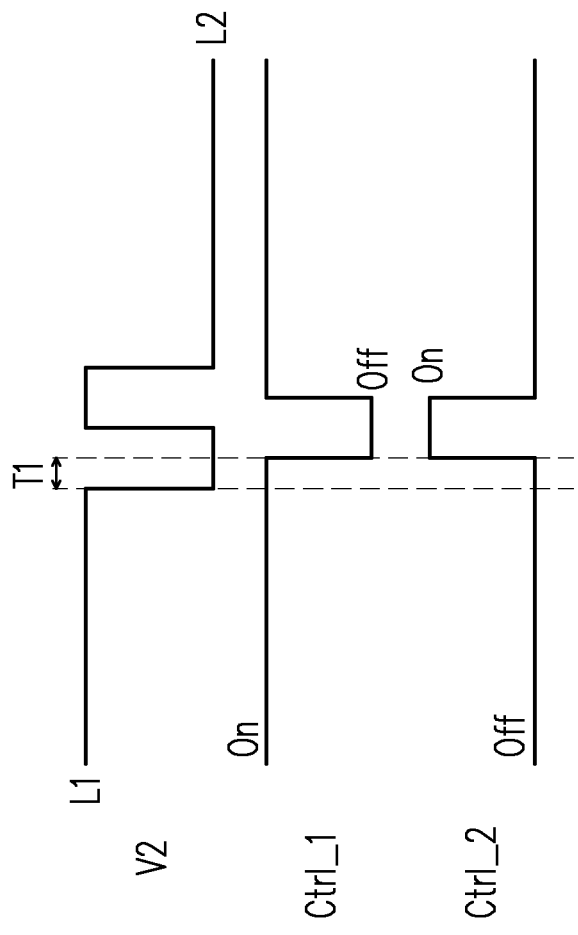
Figure 6A:
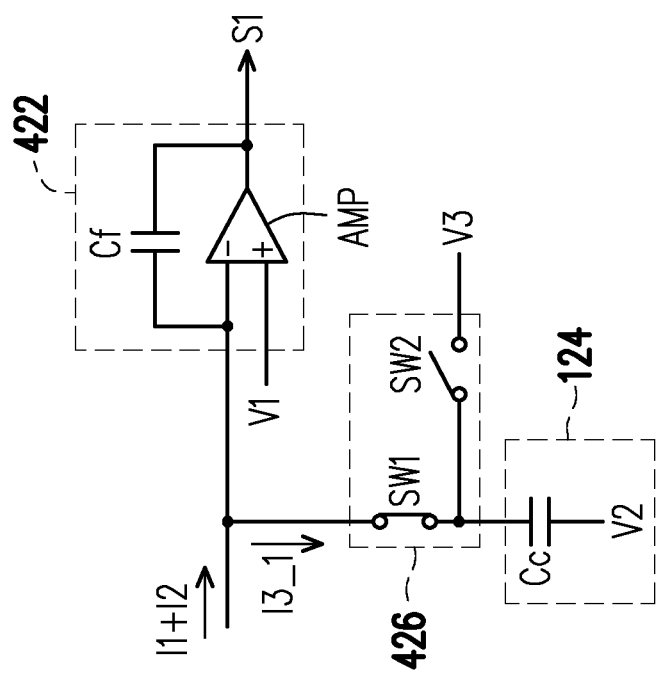
Figure 6C:
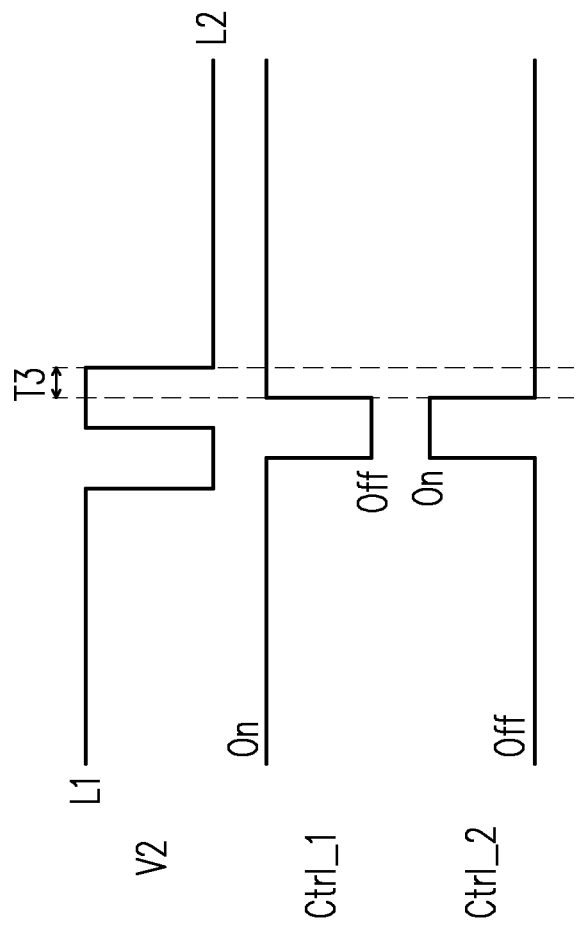
Figure 6C:
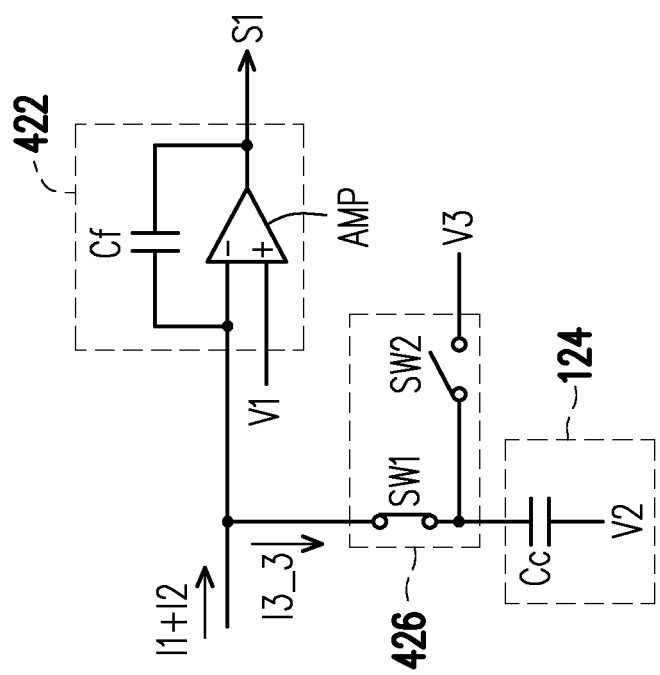

In FIG. 6C, the touch circuit 420 operates in a third stage T3. When the touch circuit 420 operates in the third stage T3 after the second stage T2, the second voltage V2 is maintained as the first level L1. The first switch SW1 is conducted, and the second switch SW2 is not conducted, so that the first terminal of the second capacitor Cc is connected to the first voltage V1 again, and the compensation current I3_3 is generated to reduce the reference current I1.

Figure 6D:
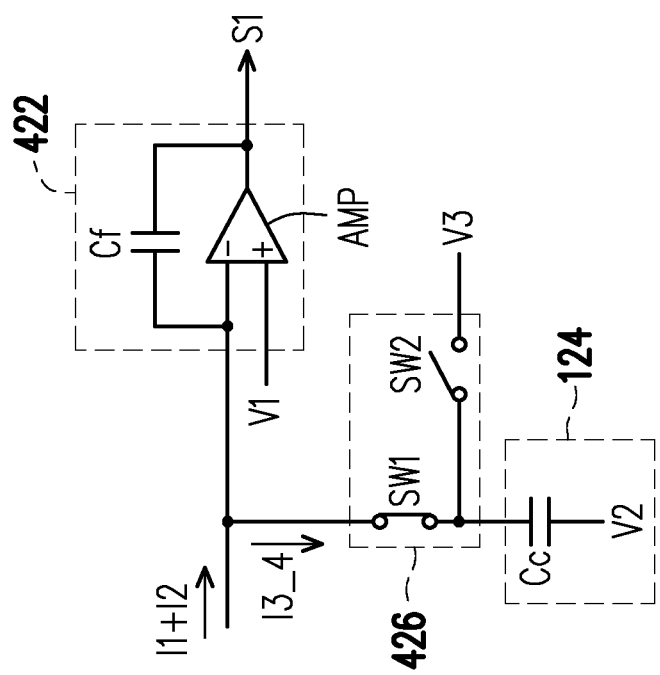
Figure 6D:
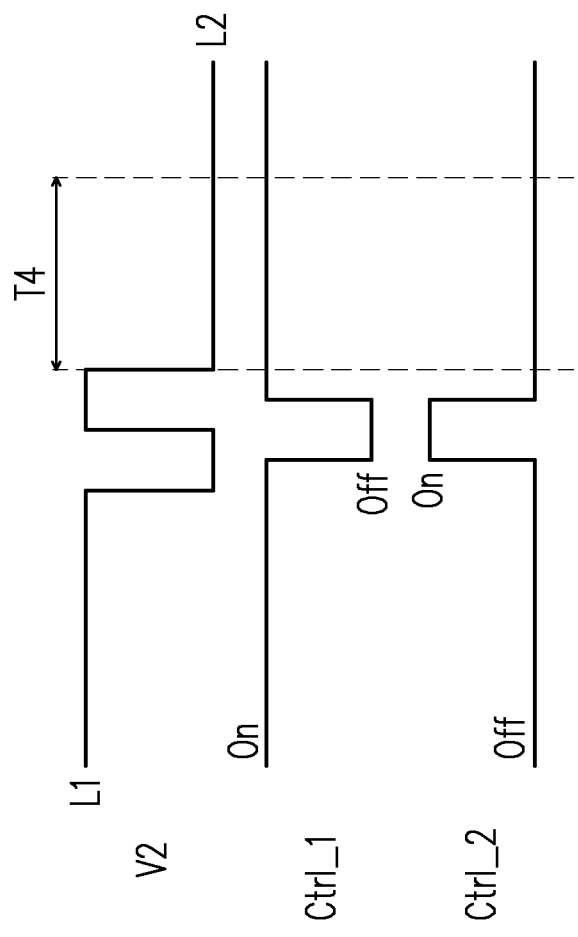

In FIG. 6D, the touch circuit 420 operates in a fourth stage T4. When the touch circuit 420 operates in the fourth stage T4 after the third stage T3, the second voltage V2 is changed from the first level L1 to the second level L2. The first switch SW1 is conducted, and the second switch SW2 is not conducted, so that the first terminal of the second capacitor Cc is connected to the first voltage V1, and the compensation current I3_4 is generated to reduce the reference current I1.

In the present embodiment, the switch circuit 426 switches many times to make the second voltage V2 switch between the first level L1 and the second level L2. FIG. 5 shows the example of switching the second voltage V2 twice, which will change the difference voltage ΔV2 by 2 times. If switching n times, it will change the difference voltage ΔV2 by a factor of n. In addition, the first terminal of the second capacitor Cc is connected to the third voltage V3, so that the second capacitor Cc can store additional compensation charge Cc×(V1−V3).

In summary, in the embodiments of the invention, the compensation charge stored in the second capacitor is increased due to the equivalent cross voltage change. This increase in compensation charge results in an increase in the compensation capacity, such as the compensation current, of the compensation circuit. As a result, the required capacitance value of the second capacitor for the compensation circuit is reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch circuit, comprising:
   an integrator circuit comprising a first terminal, a second terminal and an output terminal, wherein the first terminal of the integrator circuit is coupled to a touch sensor, and the second terminal of the integrator circuit is coupled to a first voltage; and
   a compensation circuit comprising a first terminal and a second terminal, wherein the first terminal of the compensation circuit is coupled to the first terminal of the integrator circuit, and the second terminal of the compensation circuit is coupled to a second voltage,
   wherein when the touch circuit senses a sensing current from the touch sensor, the first voltage is increased and the second voltage is decreased.

2. The touch circuit of claim 1, wherein the output terminal of the integrator circuit is coupled to a signal processing circuit, and the integrator circuit is configured to generate a sensing signal according to the sensing current and output the sensing signal to the signal processing circuit.

3. The touch circuit of claim 1, wherein the integrator circuit comprises:
   an operational amplifier comprising an inverting terminal, a non-inverting terminal and an output terminal, wherein the inverting terminal of the operational amplifier serves as the first terminal of the integrator circuit, the non-inverting terminal of the operational amplifier serves as the second terminal of the integrator circuit, and the output terminal of the operational amplifier serves as the output terminal of the integrator circuit; and
   a first capacitor comprising a first terminal and a second terminal, wherein the first terminal of the first capacitor is coupled to the inverting terminal of the operational amplifier, and the second terminal of the first capacitor is coupled to the output terminal of the operational amplifier.

4. The touch circuit of claim 3, wherein the compensation circuit comprises:
   a second capacitor comprising a first terminal and a second terminal, wherein the first terminal of the second capacitor serves as the first terminal of the compensation circuit and is coupled to the inverting terminal of the operational amplifier, and the second terminal of the second capacitor serves as the second terminal of the compensation circuit and is coupled to the second voltage.

5. A touch circuit, comprising:
   an integrator circuit comprising a first terminal, a second terminal and an output terminal, wherein the first terminal of the integrator circuit is coupled to a touch sensor, and the second terminal of the integrator circuit is coupled to a first voltage;
   a switch circuit comprising a first terminal, a second terminal and a third terminal, wherein the first terminal of the switch circuit is coupled to the first terminal of the integrator circuit; and
   a compensation circuit comprising a first terminal and a second terminal, wherein the first terminal of the compensation circuit is coupled to the second terminal of the switch circuit, and the second terminal of the compensation circuit is coupled to a second voltage,
   wherein the third terminal of the switch circuit is coupled to a third voltage, and the switch circuit is configured to switch many times to make the second voltage switch between a first level and a second level, wherein the first level is larger than the second level.

6. The touch circuit of claim 5, wherein the switch circuit comprises:
   a first switch comprising a first terminal, a second terminal and a control terminal, wherein the first terminal of the first switch serves as the first terminal of the switch circuit and is coupled to the first terminal of the integrator circuit, the second terminal of the first switch serves as the second terminal of the switch circuit and is coupled to the first terminal of the compensation circuit, and the control terminal of the first switch is controlled by a first control signal; and
   a second switch comprising a first terminal, a second terminal and a control terminal, wherein the first terminal of the second switch is coupled to the second terminal of the first switch, the second terminal of the second switch serves as the third terminal of the switch circuit and is coupled to the third voltage, and the control terminal of the second switch is controlled by a second control signal.

7. The touch circuit of claim 6, wherein when the touch circuit operates in a first stage, the second voltage is changed from the first level to the second level, wherein the first switch is conducted, and the second switch is not conducted in the first stage.

8. The touch circuit of claim 7, wherein when the touch circuit operates in a second stage after the first stage, the second voltage is changed from the second level to the first level, wherein the first switch is not conducted, and the second switch is conducted in the second stage.

9. The touch circuit of claim 8, wherein when the touch circuit operates in a third stage after the second stage, the second voltage is maintained as the first level, wherein the first switch is conducted, and the second switch is not conducted in the third stage.

10. The touch circuit of claim 9, wherein when the touch circuit operates in a fourth stage after the third stage, the second voltage is changed from the first level to the second level, wherein the first switch is conducted, and the second switch is not conducted in the fourth stage.

11. The touch circuit of claim 5, wherein the first voltage and the third voltage are constant voltages.

12. The touch circuit of claim 5, wherein the first voltage is larger than or equal to the third voltage.

13. The touch circuit of claim 5, wherein the output terminal of the integrator circuit is coupled to a signal processing circuit, and the integrator circuit is configured to generate a sensing signal according to the sensing current and output the sensing signal to the signal processing circuit.

14. The touch circuit of claim 5, wherein the integrator circuit comprises:
an operational amplifier comprising an inverting terminal, a non-inverting terminal and an output terminal, wherein the inverting terminal of the operational amplifier serves as the first terminal of the integrator circuit, the non-inverting terminal of the operational amplifier serves as the second terminal of the integrator circuit, and the output terminal of the operational amplifier serves as the output terminal of the integrator circuit; and
a first capacitor comprising a first terminal and a second terminal, wherein the first terminal of the first capacitor is coupled to the inverting terminal of the operational amplifier, and the second terminal of the first capacitor is coupled to the output terminal of the operational amplifier.

15. The touch circuit of claim 14, wherein the compensation circuit comprises:
a second capacitor comprising a first terminal and a second terminal, wherein the first terminal of the second capacitor serves as the first terminal of the compensation circuit and is coupled to the second terminal of the switch circuit, and the second terminal of the second capacitor serves as the second terminal of the compensation circuit and is coupled to the second voltage.

* * * * *